United States Patent

Watanabe et al.

[11] Patent Number: 6,042,897
[45] Date of Patent: Mar. 28, 2000

[54] COMBINATION READ/WRITE THIN FILM MAGNETIC HEAD AND ITS MANUFACTURING METHOD

[75] Inventors: Toshinori Watanabe; Kiyoshi Sato, both of Niigata-ken, Japan

[73] Assignee: Alps Electric Co., Ltd., Japan

[21] Appl. No.: 09/211,121

[22] Filed: Dec. 14, 1998

Related U.S. Application Data

[62] Division of application No. 08/972,127, Nov. 17, 1997, Pat. No. 5,959,813.

[51] Int. Cl.$^7$ ................................................... C23C 14/02
[52] U.S. Cl. .................... 427/534; 427/127; 427/130; 427/132; 427/264; 427/265; 427/271; 427/535; 427/569; 427/576; 427/579
[58] Field of Search .................... 427/127, 130, 427/131, 132, 534, 535, 576, 579, 569, 264, 265, 271

[56] References Cited

U.S. PATENT DOCUMENTS

| | | | |
|---|---|---|---|
| 5,032,945 | 7/1991 | Argyle et al. | 360/126 |
| 5,331,728 | 7/1994 | Argyle et al. | 29/603 |
| 5,388,019 | 2/1995 | Argyle et al. | 360/126 |
| 5,621,595 | 4/1997 | Cohen | 360/126 |

*Primary Examiner*—Bernard Pianalto
*Attorney, Agent, or Firm*—Brinks Hofer Gilson & Lione

[57] ABSTRACT

The present invention provides a combination read/write thin film magnetic head wherein the width of a gap layer is the same as the track width Tw, and a shielding magnetic layer of a soft magnetic material is formed on both sides of the gap layer so that blots of a record magnetic field out of the track width Tw can be absorbed by the shielding magnetic layer, and write fringing can be prevented. Particularly, when the saturation magnetic flux density and thickness of the shielding magnetic layer are appropriately adjusted, it is possible to suppress write fringing, and at the same time maintain reproduced output at a high level.

9 Claims, 13 Drawing Sheets

COMBINATION READ/WRITE THIN FILM MAGNETIC HEAD AND ITS MANUFACTURING METHOD

This application is a divisional application of Ser. No. 08/972,127, filed Nov. 17, 1997 and now U.S. Pat. No. 5,959,813.

BACKGROUND OF THE INVENTION

1. Field of the Invention

The present invention relates to a combination read/write thin film magnetic head used as a floating type magnetic head, and particularly to a combination read/write thin film magnetic head in which a shielding magnetic layer is provided on either side of a magnetic gap of an inductive thin film magnetic head in the direction of the track width thereof in order to suppress the occurrence of write fringing, and a manufacturing method thereof.

2. Description of the Related Art

FIG. 17 is a perspective view schematically showing the whole structure of a conventional combination read/write thin film magnetic head formed on a slider 10, and FIG. 18(a) is a partial front view showing the conventional combination read/write thin film magnetic head, as viewed from the side opposite to a recording medium.

The combination read/write thin film magnetic head shown in FIGS. 17 and 18(a) is formed at the trailing end of the slider 10 which constitutes a floating type head, and comprises a laminate of a reading head h1 and a recording inductive head h2.

The combination read/write thin film magnetic head further comprises a lower core layer 11 made of a magnetic material having high magnetic permeability, such as an Ni—Fe alloy (permalloy), sendust, or the like. In the combination read/write thin film magnetic head comprising the reading head h1 which employs a magnetoresistive element, and the inductive head h2 which is continuously laminated thereon, the lower core layer 11 functions not only as a core layer for the inductive head h2 but also as an upper shielding layer for the reading head h1.

On the lower core layer 11 is formed a gap layer 12 made of a non-magnetic material such as $Al_2O_3$ (alumina) or the like. On the gap layer 12 is formed an insulation layer (not shown in the drawings) made of a resist material such as polyimide or the like or another organic material. On the insulation layer is spirally formed a coil layer 5 using an electrically conductive material having low electric resistance, such as Cu or the like. The coil layer 5 is formed so as to turn round the base end 3b of an upper core layer 3.

On the coil layer 5 is formed an insulation layer (not shown in the drawings) made of an organic resin material or the like. On the insulation layer is formed the upper core layer 3 by plating a magnetic layer such as permalloy or the like. In a portion opposite to the magnetic medium, the tip 3a of the upper core layer 3 is joined to the lower core layer 11 with the gap layer 12 therebetween to form a magnetic gap having a gap length G1. The base end 3b of the upper core layer 3 is magnetically connected to the lower core layer 11.

In the writing inductive head h2, when a recording current is supplied to the coil layer 5, a record magnetic field is induced in the lower core layer 11 and the upper core layer 3, and a magnetic signal is recorded in the recording medium such as a hard disk or the like by a leakage magnetic field from the magnetic gap portion between the lower core layer 11 and the tip 3a of the upper core layer 3.

In the writing magnetic gap of the inductive head h2, the gap length G1 is determined by the distance (i.e., the thickness of the gap layer 12) between the lower core layer 11 and the tip 3a of the upper core layer 3 joined thereto with the gap layer 12 therebetween. As shown in FIG. 18(a), the track width Tw is determined by the width of the tip 3a of the upper core layer 3.

As shown in FIG. 18(a), the width T2 of the lower core layer 11 is sufficiently larger than the width Tw of the tip 3a of the upper core layer 3. The reason why the width T2 of the lower core layer 11 is larger is that the area of the upper flat surface of the upper core layer 11 is increased to facilitate the formation of the coil layer 5 on the lower core layer 11 with the insulation layer therebetween, and at the same time, to increase the magnetic shielding effect on the magnetoresistive element layer 13 formed below the inductive head h2.

In the reading head h1 which employs magnetoresistance, the magnetoresistive element layer 13 is provided on a lower shielding layer 14 with a lower gap layer 15a therebetween, and the lower core layer 11 is formed on the magnetoresistive element layer 13 with an upper gap layer 15b therebetween, the magnetoresistive element layer 13 also serving as an upper shielding layer.

If the width T2 of the lower core layer 11 is larger than the width Tw of the tip 3a of the upper core layer 3, as shown in FIG. 8(a), when a record magnetic field is induced in the lower core layer 11 and the upper core layer 3, and a recording leakage magnetic field is generated between the tip 3a and the lower core layer 11, the leakage magnetic field is beyond the range of the width (track width) Tw of the tip 3a of the upper core layer 3, and affected by the width of the lower core layer 11 to bring about blots of the magnetic field on both sides of the width Tw.

FIG. 18(b) shows a recording pattern of the data recorded by using the magnetic head shown in FIG. 18(a). The recording pattern indicates that write fringing (writing blot) occurs out of the track width Tw. The occurrence of this write fringing makes it impossible to detect the track position on the written recording medium with high precision, and thus causes tracking servo error. Particularly, in high-density recording, the pitch of adjacent tracks is small, and thus write fringing has a significant effect.

SUMMARY OF THE INVENTION

An object of the present invention is to solve the problems of prior art, and provide a combination read/write magnetic head comprising a shielding magnetic layer provided on either side of a gap layer and made of the same soft magnetic material as a lower core layer or another soft magnetic material in order to sufficiently suppress write fringing, without deteriorating over write performance during recording, and a manufacturing method thereof.

In order to achieve the object, the present invention provides a combination read/write thin film magnetic head comprising a lower core layer of a magnetic material, an upper core layer of a magnetic material provided opposite to the lower core layer and having a width smaller than that of the lower core layer, a gap layer provided between the lower core layer and the upper core layer, a coil layer for inducing a record magnetic field in the lower core layer and the upper core layer, a non-magnetic material layer formed on the lower core layer to form the gap layer by the non-magnetic material layer between the lower core layer and the upper core layer, and a shielding magnetic layer of a soft magnetic material provided to cover either side of the gap layer in the direction of the track width.

In the magnetic head, the width Tw of the upper core layer in the direction of the track width, the width of the upper surface of the gap layer which contacts the upper core layer and the width T1 of the lower surface of the gap layer which contacts the lower core layer may be the same.

In the present invention, the non-magnetic material layer on both sides of the magnetic gap layer is removed by plasma etching, leaving as a magnetic gap layer a portion of the non-magnetic material layer held between the lower core layer side and the upper core layer so that the width Tw of the upper core layer, the width of the upper surface of the non-magnetic material layer which contacts the upper core layer, and the width T1 of the lower surface of the non-magnetic material layer which contacts the lower core layer can be the same, as shown in FIGS. 1, 2, 3, 6 and 8.

The present invention also provides a combination read/write thin film magnetic head having a shape in which the width of the gap layer in the direction of the track width gradually increases from the upper surface which contacts the upper core layer to the lower surface which contacts the lower core layer. This is shown in, for example, FIGS. 4, 5 and 7.

The shielding magnetic layer is formed by, for example, removing a portion of the non-magnetic material layer where the lower core layer and the upper core layer are not opposite to each other, by ion-milling. When a portion of the non-magnetic material layer is removed by ion-milling, both sides of the gap layer in the direction of the track width are made inclined surfaces which extend toward the lower core layer.

The average thickness L1 of the shielding magnetic layer is preferably within the range of 0.001 to 1.0 μm.

When the shielding magnetic layer has a saturation magnetic flux density Bs of 0.95 T or less, the thickness L1 of the shielding magnetic layer is preferably within the range of 0.05 to 1.0 μm.

Examples of soft magnetic materials having a saturation magnetic flux density of 0.95 T or less include Ni—Fe alloys (Bs=0.95 T), Co—Zr—Nb alloys (Bs=0.5 T), and the like.

For example, when the shielding magnetic layer is made of a Ni—Fe (nickel-iron) alloy, the thickness L1 of the shielding magnetic layer is preferably within the range of 0.05 to 0.48 μm, more preferably 0.05 to 0.38 μm or 0.05 to 0.4 μm.

When the shielding magnetic layer is made of a Co—Zr—Nb (cobalt-zirconium-niobium) alloy, the thickness of the shielding magnetic layer is more preferably within the range of 0.2 to 0.73 μm.

When the saturation magnetic flux density Bs of the shielding magnetic layer is 0.95 to 1.8 T, the thickness L1 of the shielding magnetic layer is preferably within the range of 0.01 to 0.4 μm. When the saturation magnetic flux density Bs of the shielding magnetic layer is 1.8 T or more, the thickness L1 of the shielding magnetic layer is preferably within the range of 0.001 to 0.4 μm.

Examples of soft magnetic materials having a saturation magnetic flux density Bs of 0.95 T or more include the above Ni—Fe alloys, Co—Fe—Ni alloys (Bs=1.8 T), and the like.

When the shielding magnetic layer is made of a Co—Fe—Ni (cobalt-iron-nickel) alloy, the thickness L1 of the shielding magnetic layer is preferably within the range of 0.01 to 0.19 μm or 0.01 to 0.2 μm.

A method of manufacturing the combination read/write thin film magnetic head of the present invention comprises the steps of:

forming the non-magnetic material layer on the lower core layer;

forming the upper core layer on the non-magnetic material layer;

forming the gap layer by removing a portion of the non-magnetic material layer where the lower core layer and the upper core layer are not opposite to each other, leaving the non-magnetic material layer between the upper core layer and the lower core layer; and forming the shielding magnetic layer of a soft magnetic material on either side of the gap layer in the direction of the track width.

In the manufacturing method, when the non-magnetic material layer which forms the gap layer is made of a material which can be removed by plasma etching, a portion of the non-magnetic material layer is removed where the lower core layer and the upper core layer are not opposite to each other. In this case, the upper surface of the gap layer which contacts the upper core layer and the lower surface thereof which contacts the lower core layer have substantially the same width.

A portion of the non-magnetic material layer where the lower core layer and the upper core layer are not opposite to each other can also be removed by ion-milling. In this case, both sides of the gap layer become inclined surfaces.

The shielding magnetic layer can be formed by a deposition process, but it can also be formed by readhering the magnetic material which is removed from the lower core layer by ion-milling to both sides of the gap layer in the direction of the track width.

Examples of non-magnetic materials (the non-magnetic material for forming the gap layer) which can be removed by the plasma etching include single layer films of $SiO_2$, $Ta_2O_5$, $Si_3N_4$, $TiO$, $Ti_2O_3$, $Ti_3O_5$, and $TiO_2$; composite films or multilayer films comprising at least two films thereof.

As the plasma etching, unidirectional plasma etching with $CF_4$ or $CF_4+O_2$ is used in which the non-magnetic material in a portion other than the gap layer interposed between the lower core layer and the upper core layer is selectively removed. The unidirectional plasma etching causes no damage to the magnetic layers which respectively form the upper core layer and the lower core layer.

In the step of removing the non-magnetic material layer by ion-milling, inclined portions are formed not only on both sides of the gap layer, as described above, but also in the lower core layer by removing portions on both sides thereof because a soft magnetic material such as permalloy or the like which constitutes the lower core layer is readily affected by the ion milling. As the ion-milling, milling with neutral ions of argon gas is used.

As the method of forming the shielding magnetic layer of a soft magnetic material on either side of the gap layer, two methods can be provided, i.e., the method of depositing a soft magnetic material on both sides of the gap layer by sputtering or vaporization, and the method of partially removing the lower core layer by ion-milling to readhere the removed soft magnetic material to both sides of the gap layer.

Soft magnetic materials used for forming the shielding magnetic layer in the present invention are given below.
(1. Crystal material)
(1) Ni—Fe alloy
(Composition) Soft magnetic alloys represented by the composition formula $Ni_xFe_y$ wherein the composition ratios x and y by atomic % satisfy the relations, $86 \leq x \leq 92$, $8 \leq y \leq 14$ and $x+y=100$.

(2) Ni—Fe—Nb alloy (Composition) Soft magnetic alloys represented by the composition formula $Ni_xFe_yNb_z$ wherein the composition ratios x, y and z by atomic % satisfy the relations, $76 \leq x \leq 84$, $8 \leq y \leq 15$, $5 \leq z \leq 12$ and x+y+z=100.

(Effect) Decreasing an eddy current loss in high-frequency recording due to high resistivity.

(3) Co—Fe alloy (Composition) Soft magnetic alloys represented by the composition formula $Co_xFe_y$ wherein the composition ratios x and y by atomic % satisfy the relations, $86 \leq x \leq 92$, $8 \leq y \leq 14$ and x+y=100.

(4) Co—Fe—Ni alloy (Composition) Soft magnetic alloys represented by the composition formula $Co_xFe_yNi_z$ wherein the composition ratios x, y and z by atomic % satisfy the relations, $0.1 \leq x \leq 15$, $39 \leq y \leq 62$, $39 \leq z \leq 62$ and x+y+z=100.

(5) Co—Fe—Ni—X alloy (X=Mo, Cr, Pd, B, In)

(Composition) Soft magnetic alloys represented by the composition formula $Co_xFe_yNi_zX_w$ wherein the composition ratios x, y, z and w by atomic % satisfy the relations, $0.1 \leq x \leq 15$, $39 \leq y \leq 62$, $39 \leq z \leq 62$, $0.05 \leq w \leq 15$ and x+y+z+w=100.

(Effect) Decreasing an eddy current loss in high-frequency recording due to high resistivity.

(2. Amorphous materials)

(1) Co—Zr—Nb amorphous alloy (Composition) Amorphous soft magnetic alloys represented by the composition formula $Co_xZr_yNb_z$ wherein the composition ratios x, y and z by atomic % satisfy the relations, $1.5 \leq y \leq 13$, $6.5 \leq z \leq 15$, $1 \leq y/z \leq 2.5$ and x+y+z=100.

(2) Co—Hf—Ta amorphous alloy (Composition) Amorphous soft magnetic alloys represented by the composition formula, $Co_xHf_yTa_z$ wherein the composition ratios x, y and z by atomic % satisfy the relations, $1.5 \leq y \leq 13$, $6.5 \leq z \leq 15$, $1 \leq y/z \leq 2.5$ and x+y+z=100.

(Effect) Permitting deposition of films having no unidirectional magnetocrystalline anisotropy, very high magnetic permeability and excellent thermal resistance.

(3. Fine crystalline alloy)

(1) Fe-M-C alloy (M=Hf, Zr, Ti, V, Nb, Ta, Cr, Mo, W)

(Composition) Soft magnetic alloys comprising a crystal consisting of Fe as a main component and a crystal of carbide or nitride of at least one metal element selected from the group consisting of Hf, Zr, Ti, V, Nb, Ta, Cr, Mo and W, and as a whole, comprising fine crystals having a mean grain size of 40 nm or less, wherein if the mean grain size of the carbide or nitride crystal is d, and the mean grain size of the crystal consisting of Fe or Co as a main component is D, the d/D ratio is 0.05 to 0.4, the composition formula is the following:

$$Fe_xM_yC_z$$

wherein M is at least one element of Hf, Zr, Ti, V, Nb, Ta, Cr, Mo and W, and the composition ratios (atomic %) satisfy the following relations:

$50 \leq x \leq 96$, $2 \leq y \leq 30$, $0.5 \leq z \leq 25$ and x+y+z=100.

(2) Fe—X-M-C alloy (Composition) Soft magnetic alloys having a texture basically comprising fine crystal grains having a mean grain size of 0.08 m or less, and partially containing a crystal phase of a carbide of an element, and represented by the following composition formula:

$$Fe_aX_cM_eC_l$$

wherein X is at least one element of Al and Si, M is at least one element of Ti, Zr, Hf, V, Nb, Ta, Mo and W, and the composition ratios (atomic %) satisfy the following relations:

$50 \leq a \leq 95$, $0.2 \leq c \leq 25$, $2 \leq e \leq 25$, $0.5 \leq l \leq 25$ and a+c+e+l=100.

(3) T-X-M-Z-Q alloy (Composition) Soft magnetic alloys comprising a crystal consisting of Fe or Co as a main component and a crystal of carbide or nitride of at least one metal element selected from the group consisting of Ti, Zr, Hf, V, Ta, Mo and W, and as a whole, comprising fine crystals having a mean grain size of 40 nm or less, wherein if the mean grain size of the carbide or nitride crystal is d, and the mean grain size of the crystal consisting of Fe or Co as a main component is D, the d/D ratio is 0.05 to 0.4, the composition formula is the following:

$$T_aX_bM_cZ_eQ_l$$

wherein T is at least one element of Fe and Co, X is at least one element of Si and Al, M is at least one metal element selected from the group consisting of Ti, Zr, Hf, V, Ta, Mo and W, Z is at least one element of C and N, Q is at least one metal element selected from the group consisting of Cr, Re, Ru, Rh, Ni, Pd, Pt and Au, and the composition ratios (atomic %) satisfy the following relations:

$40 \leq a \leq 98.5$, $0 \leq b \leq 25$, $1 \leq c \leq 10$, $0.5 \leq e \leq 15$, $0 \leq l \leq 10$ and a+b+c+e+l=100.

(4) T-Si—Al-M-Z-Q alloy (Composition) Soft magnetic alloys comprising a fine crystal having a body centered cubic structure consisting of Fe or Co as a main component and a mean grain size of 40 nm or less, and a carbide or nitride of at least one element of Ti, Zr, Hf, V and Ta which is precipitated in the grain boundaries of the fine crystal, wherein at least one element of Cr, Ti, Mo, W, V, Re, Ru, Rh, Ni, Co, Pd, Pt and Au is dissolved in the body centered cubic structure fine crystal, and the composition formula is the following:

$$T_aSi_bAl_cM_dZ_eQ_l$$

wherein T is at least one element of Fe and Co, M is at least one of Zr, Hf, Nb and Ta, Z is at least one element of C and N, Q is at least one metal element selected from the group consisting of Cr, Ti, Mo, W, V, Re, Ru, Rh, Ni, Pd, Pt and Au, and the composition ratios (atomic %) satisfy the following relations:

$40 \leq a \leq 90$, $8 \leq b \leq 15$, $0 \leq c \leq 10$, $1 \leq d \leq 10$, $1 \leq e \leq 10$, $0 \leq l \leq 15$ and a+b+c+d+e+l=100.

(Characteristic) Having a resistivity of 120 $\mu\Omega$cm or more, and a mean grain size of 40 nm or less.

(Effect) Having thermal stability and excellent acid resistance and corrosion resistance, and permitting deposition of films having no unidirectional magnetocrystalline anisotropy.

(4. High-resistivity material)

(1) Fe-M-O (M=Hf, Zr, Ti, V, Nb, Ta, Cr, Mo, W)

(Composition) Soft magnetic alloys represented by the composition formula $Fe_aM_bO_c$ wherein M is at least one element of Hf, Zr, Ti, V, Nb, Ta, Cr, Mo and W, and the composition ratios a, b and c by atomic % satisfy the relations, $50 \leq a \leq 70$, $5 \leq b \leq 30$, $10 \leq c \leq 30$ and a+b+c=100, having a resistivity of 400 to $2 \times 10^5$ $\mu\Omega$cm, and comprising a mixture of a body centered cubic structure Fe fine crystalline phase having a mean grain size of 30 nm or less, and an amorphous phase containing much M or O, wherein the ratio of the body centered cubic structure Fe fine crystalline phase to the texture is 50 vol % or less.

(Characteristic) Comprising 50 vol % or more of amorphous phase consisting of M and O and containing the bcc Fe fine crystalline phase having a mean grain size of 30 nm or less.

(Effect) Causing a low eddy current loss in a high frequency region of several tens MHz due to high resistivity (400 to $2 \times 10^5$ $\mu\Omega$cm).

(2) Fe-M-N (M=a rare earth metal element, Hf, Zr, Ti, V, Nb, Ta or W)

(Composition) Soft magnetic alloys represented by the composition formula $Fe_aM_bN_c$ wherein M is at least one element of rare earth metal elements, Hf, Zr, Ti, V, Nb, Ta and W, and the composition ratios a, b and c by atomic % satisfy the relations, $60 \leq a \leq 80$, $10 \leq b \leq 30$, $5 \leq c \leq 30$ and a+b+c=100, and comprising a fine crystalline phase comprising a body centered cubic structure Fe as a main component and having a mean grain size of 30 nm or less, and an amorphous phase comprising as a main component a compound of N and at least one element M selected from the group consisting of the rare earth metal elements, Hf, Zr, Ti, V, Nb, Ta and W, wherein the ratio of the amorphous phase to the texture is 50 vol % or more.

(Characteristic) Comprising 50 vol % or more of amorphous phase consisting of M and N and containing the bcc Fe fine crystalline phase having a mean grain size of 30 nm or less.

(Effect) Causing a low eddy current loss in a high frequency region of several tens MHz due to high resistivity (400 to $2 \times 10^5$ $\mu\Omega$cm).

(2) Fe-M-N (M=Hf, Zr, Ti, V, Nb, Ta or W)

(Composition) Soft magnetic alloys represented by the composition formula $Fe_aM_bN_c$ wherein M is at least one element of Hf, Zr, Ti, V, Nb, Ta and W, and the composition ratios a, b and c by atomic % satisfy the relations, $69 \leq a \leq 93$, $2 \leq b \leq 15$, $5 \leq c \leq 22$ and a+b+c=100, and comprising a fine crystalline phase comprising Fe as a main component and having a mean grain size of 30 nm or less, and an amorphous phase comprising as a main component a compound of N and at least one element M selected from the group consisting of Hf, Zr, Ti, V, Nb, Ta and W.

(Characteristic) Comprising a mixture of the amorphous phase consisting of M and N, and the Fe crystalline phase having a mean grain size of 30 nm or less.

(Effect) Causing a low eddy current loss in a high frequency region of several tens MHz due to high resistivity (400 to $2 \times 10^5$ $\mu\Omega$cm).

All of the above soft magnetic materials can be deposited by sputtering, but crystalline materials 1 of the soft magnetic materials can also be plated.

When the shielding magnetic layer is formed by sputtering, the soft magnetic material for forming the shielding magnetic layer may be the same as or different from the soft magnetic material for forming the lower core layer.

When the shielding magnetic layer is formed by readhesion, a portion of the soft magnetic material which forms the lower core layer is removed by ion-milling, and the soft magnetic material removed is readhered to the both sides of the gap layer. Therefore, the material of the shielding magnetic layer is the same as the lower core layer.

In the present invention, the gap layer is formed in the same width as the upper core layer, and the shielding magnetic layer made of a soft magnetic material is provided either side of the gap layer. Thus, the leakage magnetic field out of the width Tw of the upper core layer is absorbed by the shielding magnetic layer, thereby decreasing the amount of writing blot out of the track width Tw and suppressing write fringing.

Particularly, in formation of the shielding magnetic layer, when the saturation magnetic flux density Bs and the thickness L1 thereof are appropriately adjusted, it is possible to suppress write fringing and at the same time, maintain over write performance at a high level in recording.

DESCRIPTION OF THE PREFERRED EMBODIMENTS

Figure 2:
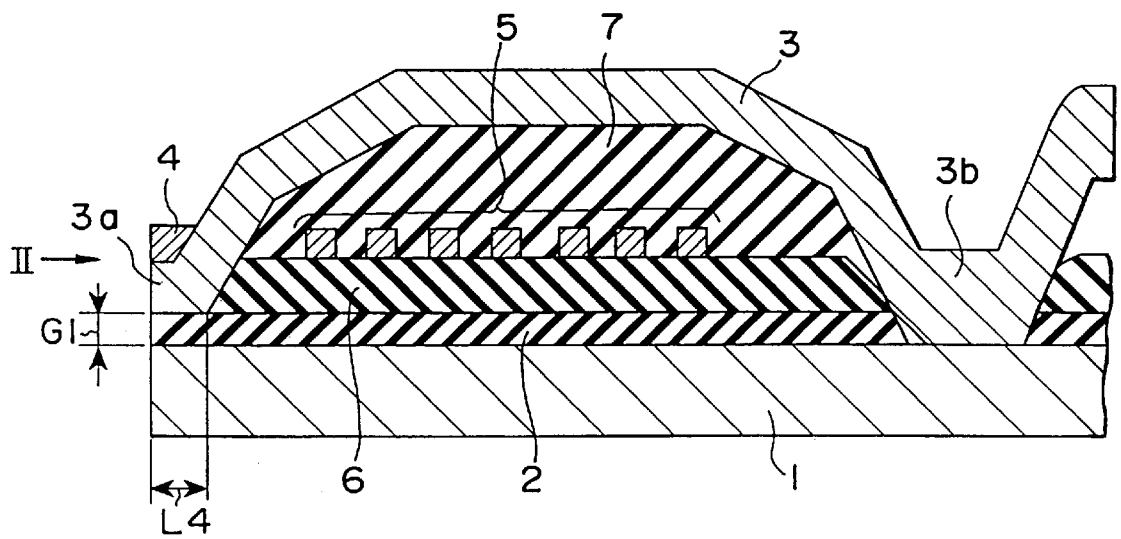
FIG. 2 is a sectional view showing the structure of a combination read/write thin film magnetic head of the present invention.
Figure 3:
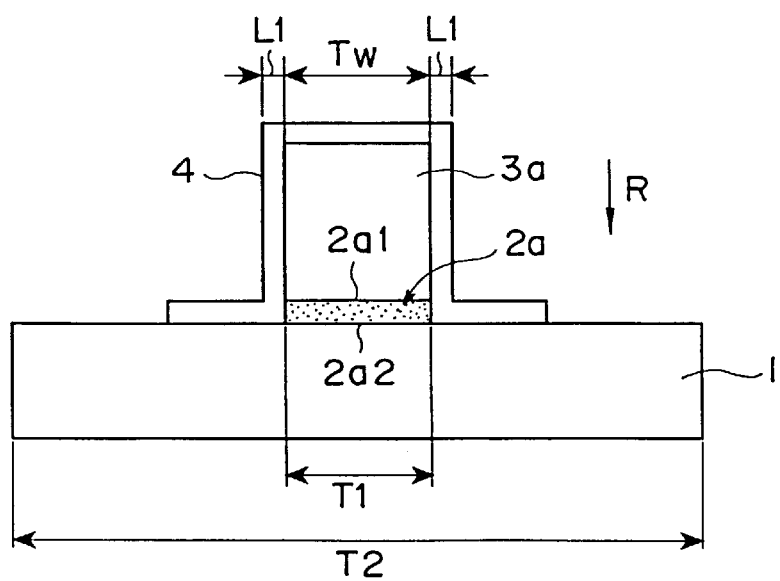
FIG. 3 is a partially enlarged front view as viewed from an arrow II of FIG. 2.

FIG. 2 is a longitudinal sectional view showing a writing inductive head of a combination read/write thin film magnetic head of the present invention, and FIG. 3 is a partial front view showing a portion of the combination read/write thin film magnetic head shown in FIG. 2 opposite to a recording medium, as viewed from an arrow II of FIG. 2.

Figure 1:
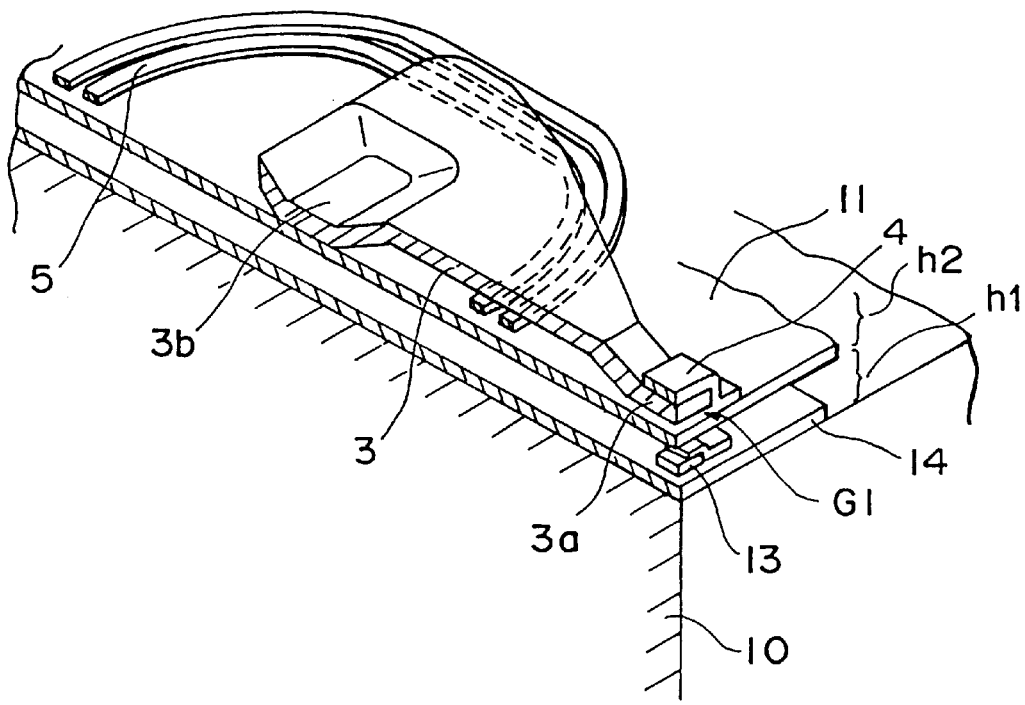
FIG. 1 is a half-sectional perspective view showing the shapes of a lower core layer and an upper core layer of a combination read/write thin film magnetic head of the present invention.

Referring to FIGS. 2 and 3, the writing inductive head comprises a lower core layer 1 and an upper core layer 3, which are made of a soft magnetic material having high magnetic permeability such as an Ni—Fe alloy (permalloy) or the like. As shown in FIG. 1, a reading head which comprises a magnetoresistive element layer 13 and a lower shielding layer 14 and which employs magnetoresistance is provided below the lower core layer 1 so that the lower core layer 1 also serves as an upper shielding layer for the magnetoresistive element layer 13. In order to enable stable formation of a coil layer 5 above the lower core layer 1, the lower core layer 1 is formed with a sufficiently large width T2 so that the lower core layer 1 can sufficiently exhibit the function as the upper shielding layer for the magnetoresistive element layer 13.

The magnetoresistive element layer 13 comprises, for example, a laminate of a soft magnetic layer (soft adjacent layer SAL), a non-magnetic layer (SHUNT layer) and a magnetoresistive layer (MR layer). On both sides of the magnetoresistive element layer 13 are provided a hard bias layer for applying a longitudinal bias magnetic field, and a main lead layer for applying a sensing current.

A non-magnetic material layer 2 is formed over the whole upper surface of the lower core layer 1. However, in a portion with the gap depth L4 shown in FIG. 2, the non-magnetic material layer 2 is left as a gap layer 2a in a portion where the lower core layer 1 and the tip 3a of the upper core layer 3 are opposite to each other, and the non-magnetic material layer 2 is removed in a portion where the lower core layer 1 and the tip 3a of the upper core layer 3 are not opposite to each other. The tip 3a of the upper core layer 3 is joined to the lower core layer 1 with the gap layer 2a therebetween.

In the combination read/write thin film magnetic head shown in FIG. 3, both the width of the upper surface 2a1 of the gap layer 2a which contacts the tip 3a of the upper core layer 3 and the width T1 of the lower surface 2a2 of the gap layer 2a which contacts the lower core layer are the same as the width Tw of the tip 3a.

The non-magnetic material layer 2 can be formed by sputtering. However, in the magnetic head shown in FIG. 3, the non-magnetic material layer can be removed by chemical function of plasma etching, and is made of a material which does not damage the soft magnetic material (for example, permalloy), which forms the lower core layer 1, in the plasma etching step. The non-magnetic material is, for example, a single layer film of $SiO_2$, $Ta_2O_5$, $Si_3N_4$, TiO, $Ti_2O_3$, $Ti_3O_5$, $TiO_2$ or $WO_3$, or a composite or multilayer film comprising at least two films thereof.

On the non-magnetic material layer 2 is formed an insulation layer 6 of a resist material, e.g., an organic resin material. On the insulation layer 6 is formed a coil layer 5 by using a electrically conductive material having low electric resistance, such as Cu or the like. The coil layer 5 is spirally formed in a plane around the base end 3b of the upper core layer 3. On the coil layer 5 is formed an insulation layer 7 comprising an organic resin layer to cover the coil layer 5.

On the insulation layer 7 is formed the upper core layer 3 by the plating process. The upper core layer 3 comprises a magnetic material such as permalloy or the like, the tip 3a thereof being joined to the opposite surface of the lower core layer 1 with the gap layer 2a therebetween to form a magnetic gap having a gap length G1. The track width of the magnetic gap is determined by the width Tw of the tip 3a of the upper core layer 3. The base end 3b of the upper core layer 3 is magnetically connected to the lower core layer 1.

A shielding magnetic layer 4 made of a soft magnetic material is deposited by sputtering over a portion extending from both sides of the gap layer 2a in the direction of the track width to the upper surface of the tip 3a of the upper core layer. However, the average thickness L1 of the shielding magnetic layer 4 is preferably within the range of 0.001 to 1.0 μm.

Particularly, when the saturation magnetic flex density Bs of the shielding magnetic layer is 0.95 T or less, the thickness L1 of the shielding magnetic layer is more preferably within the range of 0.05 to 1.0 μm. When the saturation magnetic flex density Bs of the shielding magnetic layer is 0.95 to 1.8 T, the thickness L1 of the shielding magnetic layer is more preferably within the range of 0.01 to 0.4 μm. When the saturation magnetic flex density Bs of the shielding magnetic layer is 1.8 T or more, the thickness L1 of the shielding magnetic layer is more preferably within the range of 0.001 to 0.4 μm.

The upper core layer 3 is covered with a protective layer (not shown) made of a non-magnetic material such as aluminum oxide or the like.

In this inductive head, when a recording current is supplied to the coil layer 5, a record magnetic field is induced in the lower core layer 1 and the upper core layer 3, and a magnetic signal is recorded on a recording medium such as a hard disk or the like by a leakage magnetic field between the lower core layer 1 and the tip 3a of the upper core layer 3 in the portion with the gap length G1.

Also, in the inductive head, the width of the gap layer 2a is substantially the same as the track width Tw, and the shielding magnetic layer 4 of a soft magnetic material is formed on both sides of the gap layer 2a. Therefore, blots of the record magnetic field out of the track width Tw are absorbed by the shielding magnetic layer 4, and thus write fringing can be suppressed. Since the write fringing can effectively be suppressed, it is possible to perform recording with a very short track pitch and high density recording.

Particularly, when the shielding magnetic layer 4 is formed in the thickness L1 which satisfies the above conditions, it is possible to suppress write fringing and, at the same time, maintain the over write performance at a high level during recording.

The method of manufacturing the combination read/write thin film magnetic head shown in FIG. 3 will be described below.

First, a soft magnetic material with high magnetic permeability, such as permalloy, is plated to form the lower core layer 1 having a rectangular front side having a width T2, as shown in FIG. 3. Next, the non-magnetic material layer 2 is formed over the whole upper surface of the lower core layer 1. As the non-magnetic material, a material which does not damage the soft magnetic material of the lower core layer 1 in the plasma etching step with $CF_4$ or $CF_4$ and oxygen ($O_2$) is selected. A suitable non-magnetic material is a single layer film of $SiO_2$, $Ta_2O_5$, $Si_3N_4$, TiO, $Ti_2O_3$, $Ti_3O_5$, $TiO_2$ or $WO_3$, or a composite or multilayer film comprising at least two films thereof.

To the non-magnetic material layer 2 is joined the tip 3a of the upper core layer 3 of a magnetic material having the width Tw. The upper core layer 3 is formed on the insulation layer 7 shown in FIG. 2 by plating. This step comprises forming a resist pattern in a portion other than the region where the upper core layer 3 is formed, plating the soft magnetic material on a portion without the resist pattern formed, and then removing the resist material. As a result, the tip 3a of the upper core layer 3 is formed with the width Tw.

Next, portions of the non-magnetic material layer 2 on both sides of the gap layer 2a are removed by plasma etching, leaving as the gap layer 2a the non-magnetic material layer 2 interposed between the tip 3a of the upper core layer 3 and the lower core layer 1.

The plasma etching is carried out with unidirectionality only in the direction of an arrow R. Therefore, the gap layer 2a interposed between the tip 3a and the lower core layer 1 is not affected by the plasma etching and left with the width Tw (=T1) between the tip 3a and the lower core layer 1. The plasma etching is performed for removing the non-magnetic material by chemical function, and thus the magnetic material which forms the lower core layer 1 is not damaged by the plasma etching.

Next, the shielding magnetic layer 4 made of a soft magnetic material is deposited by sputtering over a portion extending from the both sides of the gap layer 2a in the direction of the track width to the upper surface of the tip 3a of the upper core layer 3. The soft magnetic material which forms the shielding magnetic layer 4 may be the same as or different from the soft magnetic material which forms the lower core layer 1. However, the shielding magnetic layer 4 must be formed so that the thickness L1 thereof satisfies the above conditions.

Figure 4:
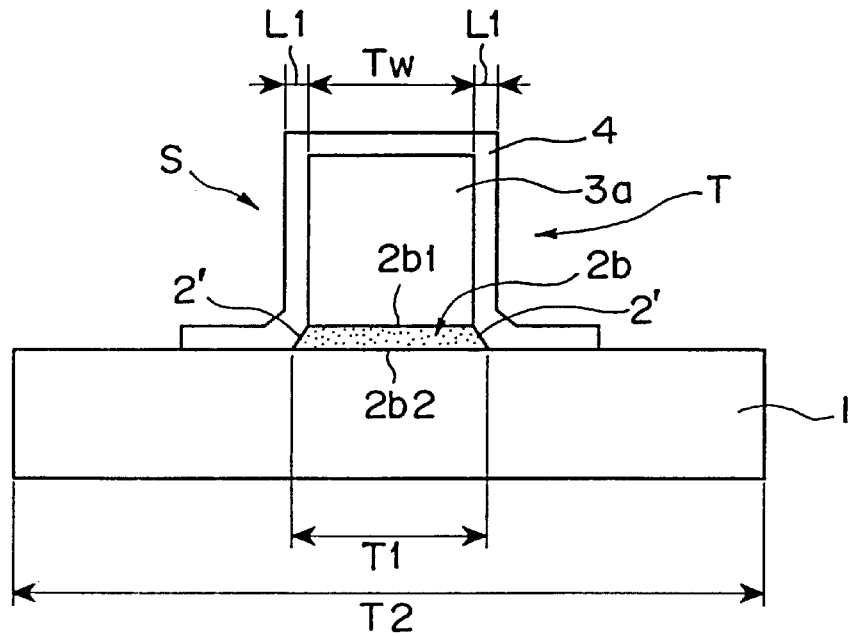
FIG. 4 is a partially enlarged front view of a combination read/write thin film magnetic head in accordance with a second embodiment of the present invention.
Figure 5:
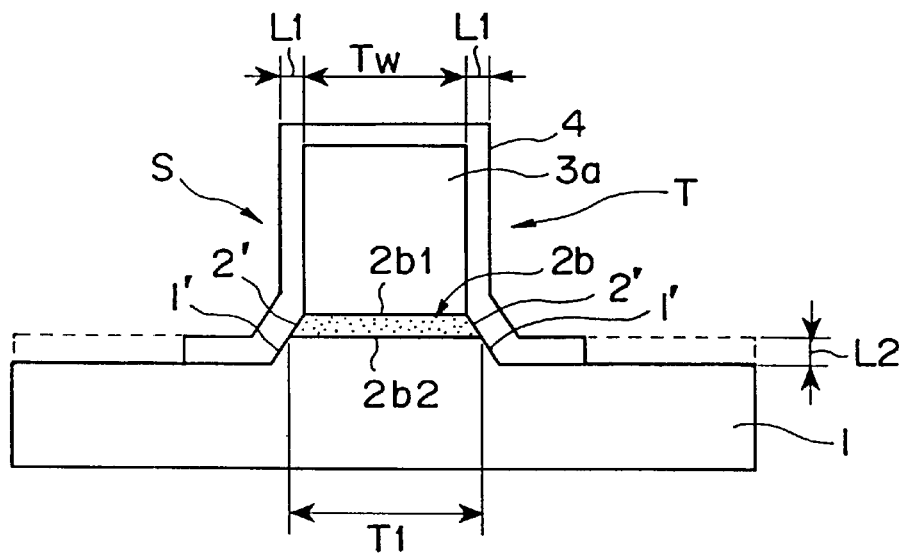
FIG. 5 is a partially enlarged front view of a combination read/write thin film magnetic head in accordance with a third embodiment of the present invention.
Figure 6:
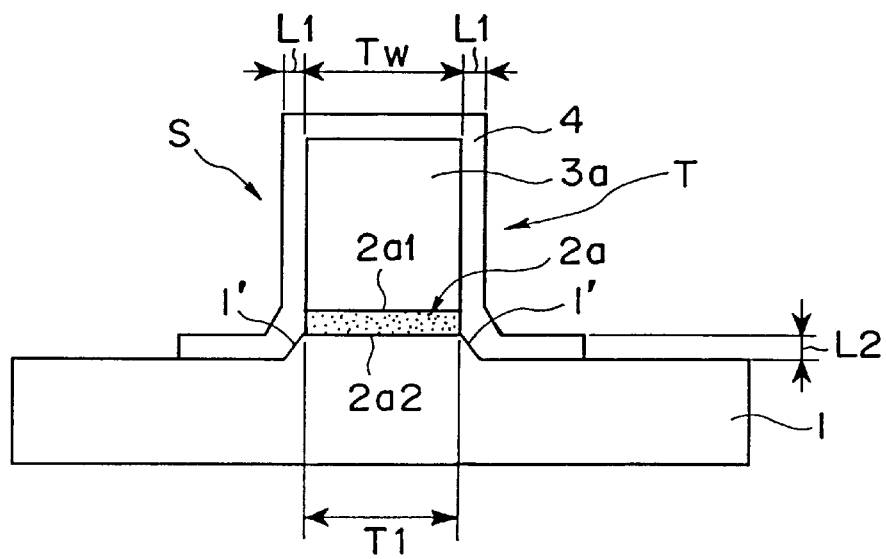
FIG. 6 is a partially enlarged front view of a combination read/write thin film magnetic head in accordance with a fourth embodiment of the present invention.

FIGS. 4 to 6 show modified examples of the shielding magnetic layer 4 formed by sputtering.

In the thin film magnetic head shown in FIG. 4, a portion of the non-magnetic material layer 2 other than the gap layer 2b interposed between the tip 3a of the upper core layer 3 and the lower core layer 1 is removed by ion-milling. By using ion-milling in place of plasma etching, inclined portions 2' are formed on both sides of the gap layer 2b, and the width T1 of the lower surface 2b2 of the gap layer 2b which contacts the lower core layer 1 is slightly longer than the width of the upper surface 2b1 of the gap layer 2b which contacts the tip 3a of the upper core layer 3.

In the ion-milling, neutral ions of Ar (argon) gas are used, the non-magnetic material layer 2 formed on the lower core layer 1 is irradiated with the ions in directions of inclined arrows S and T to remove a portion of the non-magnetic material layer 2 other than the gap layer 2b interposed between the tip 3a and the lower core layer 1, by physical function. At the same time, the inclined portions 2' are formed on both sides of the gap layer 2b in the direction of the track width to form the gap layer 2b having a trapezoidal front side.

If the strength of ion-milling is increased, the lower core layer 1 of a soft magnetic material is also affected by the ion milling. As a result, the lower core layer 1 is removed to a depth L2 to form, in the lower core layer 1, inclined surfaces 1' which respectively continue from the inclined portions 2' of the gap layer 2b, as in the thin film magnetic head shown in FIG. 5.

When the gap layer 2b is formed by the ion-milling, since the width T1 of the lower surface 2b2 of the gap layer 2b which contacts the lower core layer 1 is slightly longer than the track width tw, as shown in FIGS. 4 and 5, blots of the record magnetic field easily occur out of the track width Tw. However, the effect of preventing fringing can be obtained by forming the shielding magnetic layer 4. Particularly, when the shielding magnetic layer 4 is formed to the thickness L1 which satisfies the above conditions, the amount of write fringing can be decreased, and at the same time, the over write performance can be maintained at a high level during recording.

Also, when the gap layer 2b is formed by the ion-milling, aluminum oxide or the like, which is conventionally used, can be used as the non-magnetic material. Namely, unlike the case of plasma etching shown in FIG. 3, the non-magnetic material layer 2 need not be formed by using a material suitable for plasma etching, thereby widening the selectivity of materials.

In the combination read/write thin film magnetic head shown in FIG. 6, a portion of the non-magnetic material layer 2 other than the gap layer 2a interposed between the tip 3a of the upper core layer 3 and the lower core layer 1 is removed by plasma etching, and the lower core layer 1 is removed by the thickness L2 by ion-milling. The shielding magnetic layer 4 is formed by a deposition process such as sputtering. Therefore, the upper surface 2a1 and the lower surface 2a2 of the gap layer 2a have the same width, and inclined surfaces 1' are formed only in the lower core layer 1 to form a trapezoidal front side.

Figure 7:
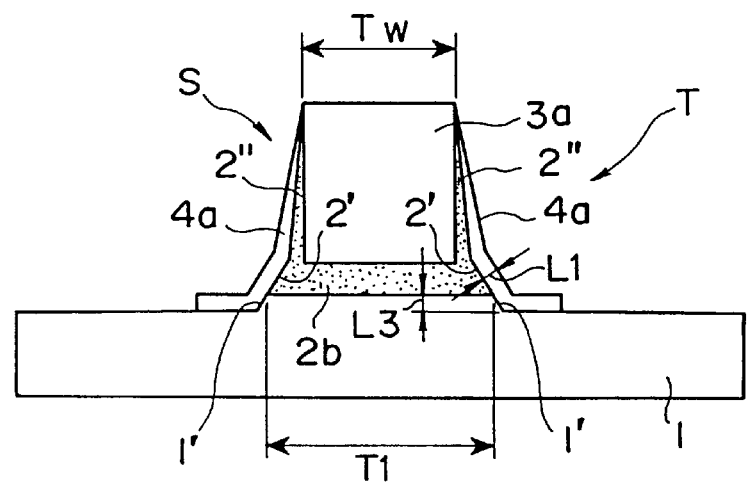
FIG. 7 is a partially enlarged front view of a combination read/write thin film magnetic head in accordance with a fifth embodiment of the present invention.
Figure 8:
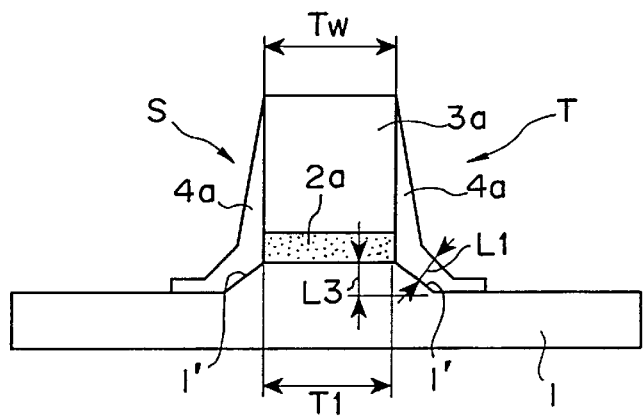
FIG. 8 is a partially enlarged front view of a combination read/write thin film magnetic head in accordance with a sixth embodiment of the present invention.

FIGS. 7 and 8 show a method comprising removing the lower core layer 1 by the thickness L3 by ion-milling, and readhering the removed magnetic material to both sides of the gap layer to form a shielding magnetic layer 4a.

In the combination read/write thin film magnetic head shown in FIG. 7, the non-magnetic material layer 2 is removed by ion-milling in the directions of arrows S and T to form the gap layer 2b between the tip 3a of the upper core layer 3 and the lower core layer 1. At the same time, inclined portions 2' are formed on both sides of the gap layer 2b, the width T1 being slightly longer than the track width Tw. At this time, the non-magnetic material removed from a portion other than the gap layer 2b is readhered to both sides of the tip 3a of the upper core layer 3 to form readhered thin layers 2".

Further, the lower core layer is removed by the thickness L3 in an ion-milling step continued from the step of removing the non-magnetic material layer 2 or a separate ion-milling step to form the inclined surfaces 1' in the lower core layer 1. The removed soft magnetic material having the thickness L3 is readhered to the vicinities of both sides of the gap layer 2b and to the surfaces of the readhered layers 2", to form the shielding magnetic layers 4a.

In the combination read/write thin film magnetic head shown in FIG. 8, the non-magnetic material layer 2 is removed by plasma etching to form the gap layer 2a having the same width L1 as the track width Tw. Next, the lower core layer 1 is removed by the thickness L3 by ion-milling, and the soft magnetic material removed from the lower core layer by the thickness L3 is readhered to both sides of the gap layer 2 to form the shielding magnetic layers 4a.

When the shielding magnetic layers 4a are formed by readhesion, the material of the shielding magnetic layers 4a is the same as the lower core layer 1.

It is necessary for the shielding magnetic layers 4a shown in FIGS. 7 and 8 to satisfy at least the conditions of the thickness L1 of the shielding magnetic layer 4 of the thin film magnetic head shown in FIG. 3.

When the shielding magnetic layers 4a are formed by readhesion, the thickness L1 of the shielding magnetic layers 4a is determined by the amount of the soft magnetic material removed from the lower core layer to the thickness L3 by ion-milling, and thus the soft magnetic material having the thickness L3 must be removed so that the thickness L1 of the shielding magnetic layers 4a satisfies the above-described conditions. This is determined by the milling time and the degree of vacuum.

In the inductive head where the shielding magnetic layers 4a are formed by readhesion, like the inductive head where the shielding magnetic layer 4 is formed by deposition, since blots of the record magnetic field occur out of the track width Tw is absorbed by the shielding magnetic layer 4a, it is possible to suppress write fringing, and at the same time, maintain the over write performance at a high level.

EXAMPLES

Description will be made of examples of the combination read/write thin film magnetic head where the shielding magnetic layer is formed on both sides of the gap layer.

The relation between the thickness L1 of the shielding magnetic layer 4 and the fringing amount and the relation between the thickness L1 of the shielding magnetic layer 4 and over write performance were examined by using the combination read/write thin film magnetic head shown in FIG. 5.

The manufacturing method and the shape of the combination read/write thin film magnetic head shown in FIG. 5 have the following characteristics:

(1) The shielding magnetic layer 4 is formed by sputtering.

(2) The soft magnetic material of the lower core layer 1 is removed by the thickness L2 by ion-milling to form the inclined portions 1'.

(3) The gap layer 2a has the inclined portions 2', and is formed so that the width T1 of the lower surface 2b2 thereof which contacts the lower core layer 1 is slightly longer than the track width Tw.

Figure 9:
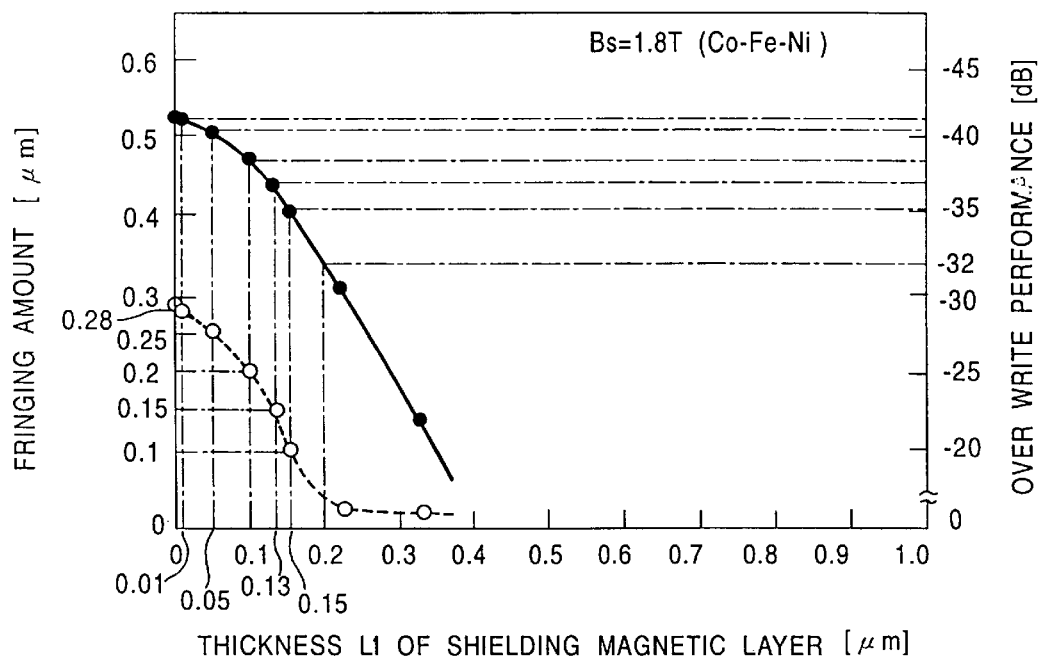
FIG. 9 is a graph showing the relations between the thickness L1 of the shielding magnetic layer 4 and the write fringing amount and between the thickness L1 and over write performance when the shielding magnetic layer 4 of the combination read/write thin film magnetic head shown in FIG. 5 is formed by using a Co—Fe—Ni alloy.

FIG. 9 shows the results of experiment using a Co—Fe—Ni (cobalt-iron-nickel) alloy for the shielding magnetic layer 4, the Co—Fe—Ni alloy having a saturation magnetic flux density Bs of 1.8 T (tesla).

Figure 10:
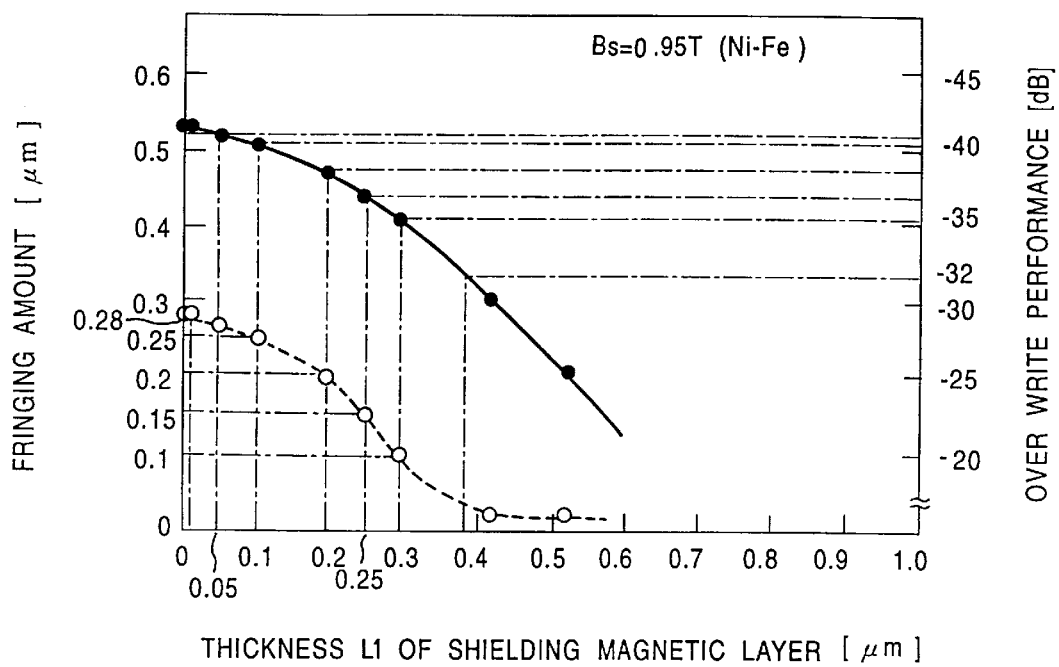
FIG. 10 is a graph showing the relations between the thickness L1 of the shielding magnetic layer 4 and the write fringing amount and between the thickness L1 and over write performance when the shielding magnetic layer 4 of the combination read/write thin film magnetic head shown in FIG. 5 is formed by using a Ni—Fe alloy.

FIG. 10 shows the results of experiment using a Ni—Fe (nickel-iron) alloy for the shielding magnetic layer 4, the Ni—Fe alloy having a saturation magnetic flux density Bs of 0.95 T (tesla).

Figure 11:
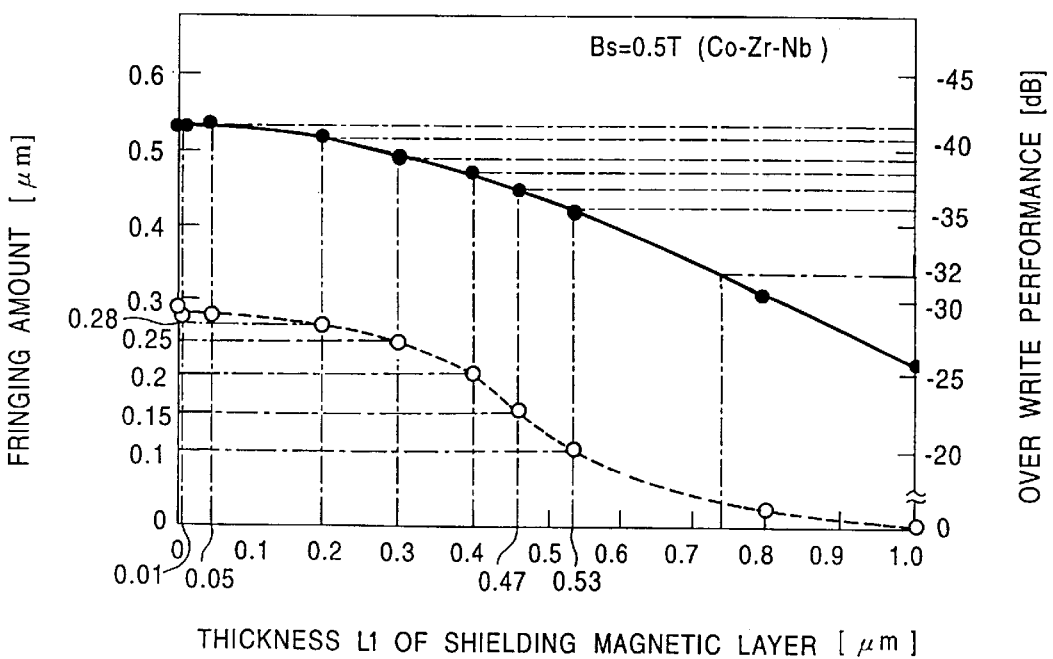
FIG. 11 is a graph showing the relations between the thickness L1 of the shielding magnetic layer 4 and the write fringing amount and between the thickness L1 and over write performance when the shielding magnetic layer 4 of the combination read/write thin film magnetic head shown in FIG. 5 is formed by using a Co—Zr—Nb alloy.

FIG. 11 shows the results of experiment using a Co—Zr—Nb (cobalt-zirconium-niobium) alloy for the shielding magnetic layer 4, the Co—Zr—Nb alloy having a saturation magnetic flux density Bs of 0.5 T (tesla).

In the drawings, a curve formed by open circle marks O shows the relation between the thickness L1 of the shielding magnetic layer 4 and the fringing amount, and a curve formed by black dot marks · shows the relation between the thickness L1 of the shielding magnetic layer 4 and over write performance (dB) during recording. The fringing amount ($\mu$m) means the length obtained by subtracting the track width Tw from the length TF of the record pattern of magnetic data recorded on a recording medium. The over write performance means the reproduced output value after magnetic data has been recorded on the recording medium.

FIGS. 9 to 11 indicate that as the thickness L1 ($\mu$m) of the shielding magnetic layer 4 increases, the fringing amount ($\mu$m) decreases, and at the same time, the over write performance (dB) also deteriorates.

This is possibly caused by the phenomenon that as the thickness ($\mu$m) of the shielding magnetic layer 4 increases, blots of the record magnetic field occur out of the track width Tw is easily absorbed by the shielding magnetic layer 4, and thus the fringing amount ($\mu$m) decreases. However, at the same time, the effective record magnetic field produced in the track width is also easily absorbed by the shielding magnetic layer 4, and thus the over write performance (dB) possibly deteriorates.

It is also found that even with a small thickness L1, the fringing amount can be decreased by increasing the saturation magnetic flux density Bs, and the over write performance can be maintained at a high level with a smaller thickness L1.

Preferably, the absolute value of the over write performance (dB) is 32 dB or more, and the fringing amount ($\mu$m) is 0.28 $\mu$m or less. When the thickness L1 corresponding to these ranges is determined from the drawings, in the use of the Co—Fe—Ni alloy having maximum Bs, the Ni—Fe alloy and the Co—Zr—Nb alloy having minimum Bs, the thickness L1 is 0.01 to 0.19 $\mu$m or 0.01 to 0.2 $\mu$m, 0.05 to 0.38 $\mu$m or 0.05 to 0.4 $\mu$m and 0.2 to 0.73 $\mu$m, respectively.

More preferably, the absolute value of the over write performance (dB) is 32 dB or more, and the fringing amount ($\mu$m) is 0.25 $\mu$m or less. When the thickness L1 corresponding to these ranges is determined from the drawings, in the use of the Co—Fe—Ni alloy having maximum Bs, the Ni—Fe alloy and the Co—Zr—Nb alloy having minimum Bs, the thickness L1 is 0.05 to 0.19 $\mu$m or 0.05 to 0.2 $\mu$m, 0.1 to 0.38 $\mu$m or 0.1 to 0.4 $\mu$m and the thickness L1 is 0.3 to 0.73 $\mu$m, respectively.

More preferably, the absolute value of the over write performance (dB) is 32 dB or more, and the fringing amount ($\mu$m) is 0.2 $\mu$m or less. When the thickness L1 corresponding to these ranges is determined from the drawings, in the use of the Co—Fe—Ni alloy having maximum Bs, the Ni—Fe alloy and the Co—Zr—Nb alloy having minimum Bs, the thickness L1 is 0.1 to 0.19 μm or 0.1 to 0.2 μm, 0.2 to 0.38 μm or 0.2 to 0.4 μm and the thickness L1 is 0.4 to 0.73 μm, respectively.

More preferably, the absolute value of the over write performance (dB) is 32 dB or more, and the fringing amount (μm) is 0.15 μm or less. When the thickness L1 corresponding to these ranges is determined from the drawings, in the use of the Co—Fe—Ni alloy having maximum Bs, the Ni—Fe alloy and the Co—Zr—Nb alloy having minimum Bs, the thickness L1 is 0.13 to 0.19 μm or 0.13 to 0.2 μm, 0.25 to 0.38 μm or 0.25 to 0.4 μm and the thickness L1 is 0.47 to 0.73 μm, respectively.

Most preferably, the absolute value of the over write performance (dB) is 32 dB or more, and the fringing amount (μm) is 0.1 μm or less. When the thickness L1 corresponding to these ranges is determined from the drawings, in the use of the Co—Fe—Ni alloy having maximum Bs, the Ni—Fe alloy and the Co—Zr—Nb alloy having minimum Bs, the thickness L1 is 0.15 to 0.19 μm or 0.15 to 0.2 μm, 0.3 to 0.38 μm or 0.3 to 0.4 μm and the thickness L1 is 0.53 to 0.73 μm, respectively.

It can be thought from FIGS. 10 and 11 that if the Bs value of 0.95 T of the Ni—Fe alloy is considered as a mean value, when the Bs is 0.95 T or less, the thickness L1 of the shielding magnetic layer is preferably appropriately selected within the range of 0.05 to 1.0 μm in order to achieve an absolute value of over write performance (dB) of 32 dB or more and a fringing amount (μm) of 0.28 μm or less.

It can also be thought from FIGS. 10 and 11 that in order to achieve an absolute value of over write performance (dB) of 32 dB or more, and a fringing amount (μm) of 0.25 μm or less, the thickness L1 of the shielding magnetic layer is preferably appropriately selected within the range of 0.1 to 1.0 μm.

It can further be thought from FIGS. 10 and 11 that in order to achieve an absolute value of over write performance (dB) of 32 dB or more, and a fringing amount (μm) of 0.2 μm or less, the thickness L1 of the shielding magnetic layer is preferably appropriately selected within the range of 0.2 to 1.0 μm.

It can further be thought from FIGS. 10 and 11 that in order to achieve an absolute value of over write performance (dB) of 32 dB or more, and a fringing amount (μm) of 0.15 μm or less, the thickness L1 of the shielding magnetic layer is preferably appropriately selected within the range of 0.25 to 1.0 μm.

It can further be thought from FIGS. 10 and 11 that in order to achieve an absolute value of over write performance (dB) of 32 dB or more, and a fringing amount (μm) of 0.1 μm or less, the thickness L1 of the shielding magnetic layer is preferably appropriately selected within the range of 0.3 to 1.0 μm.

It can be thought from FIGS. 9 and 10 that when Bs is 0.95 T or more, in order to achieve an absolute value of over write performance (dB) of 32 dB or more, and a fringing amount (μm) of 0.28 μm or less, the thickness L1 of the shielding magnetic layer is preferably appropriately selected within the range of 0.01 to 0.4 μm.

It can also be thought from FIGS. 9 and 10 that in order to achieve an absolute value of over write performance (dB) of 32 dB or more, and a fringing amount (μm) of 0.25 μm or less, the thickness L1 of the shielding magnetic layer is preferably appropriately selected within the range of 0.05 to 0.4 μm.

It can further be thought from FIGS. 9 and 10 that in order to achieve an absolute value of over write performance (dB) of 32 dB or more, and a fringing amount (μm) of 0.2 μm or less, the thickness L1 of the shielding magnetic layer is preferably appropriately selected within the range of 0.1 to 0.4 μm.

It can further be thought from FIGS. 9 and 10 that in order to achieve an absolute value of over write performance (dB) of 32 dB or more, and a fringing amount (μm) of 0.15 μm or less, the thickness L1 of the shielding magnetic layer is preferably appropriately selected within the range of 0.13 to 0.4 μm.

It can further be thought from FIGS. 9 and 10 that in order to achieve an absolute value of over write performance (dB) of 32 dB or more, and a fringing amount (μm) of 0.1 μm or less, the thickness L1 of the shielding magnetic layer is preferably appropriately selected within the range of 0.15 to 0.4 μm.

Influences of the thickness L1 on the fringing amount (m) and the over write performance (dB) were examined by using a Ni—Fe alloy for the lower core layer 1 and the shielding magnetic layer 4 (or 4a), while changing the thickness L1. The Ni—Fe alloy had a saturation magnetic flux density Bs of 0.95 T (tesla).

The following five types of combination read/write thin film magnetic heads were used as the combination read/write thin film magnetic head, and several combination read/write thin film magnetic heads having different thicknesses L1 were manufactured for each of the types of combination read/write thin film magnetic heads, and subjected to experiment.

The characteristics of the five types of combination read/write thin film magnetic heads will be described below.

(1) Combination read/write thin film magnetic head shown in FIG. 3 (referred to as "Type A" hereinafter)

(Characteristic) The shielding magnetic layer 4 is deposited.

The gap layer 2a is formed by plasma etching.

(2) Combination read/write thin film magnetic head shown in FIG. 4 (referred to as "Type B" hereinafter)

(Characteristic) The shielding magnetic layer 4 is deposited.

The gap layer 2a is formed by ion-milling.

(3) Combination read/write thin film magnetic head shown in FIG. 5 (referred to as "Type C" hereinafter)

(Characteristic) The shielding magnetic layer 4 is deposited.

The gap layer 2a is formed by ion-milling.

The inclined surfaces 1' are formed in the lower core layer 1 by ion-milling.

(4) Combination read/write thin film magnetic head shown in FIG. 7 (referred to as "Type D" hereinafter)

(Characteristic) The shielding magnetic layer 4a is formed by readhesion.

The gap layer 2a is formed by ion-milling.

The inclined surfaces 1' are formed in the lower core layer 1 by ion-milling.

(5) Combination read/write thin film magnetic head shown in FIG. 8 (referred to as "Type E" hereinafter)

(Characteristic) The shielding magnetic layer 4a is formed by readhesion.

The gap layer 2a is formed by plasma etching.

The inclined surfaces 1' are formed in the lower core layer 1 by ion-milling.

FIGS. 12, 13, 14, 15 and 16 are graphs showing experimental results with Type A, Type B, Type C, Type D and Type E, respectively. In FIGS. 12 to 16, a curve formed by open circle marks O shows the relation between L1 and the fringing amount (μm), and a curve formed by black dot marks · shows the relation between L1 and the over write performance (dB).

It can be found that in all figures, if L1 is within the range of 0.05 to 0.48 μm, the fringing amount (μm) can be suppressed to some extent, and at the same time, the over write performance (dB) can be maintained at a high level to some extent.

Figure 12:
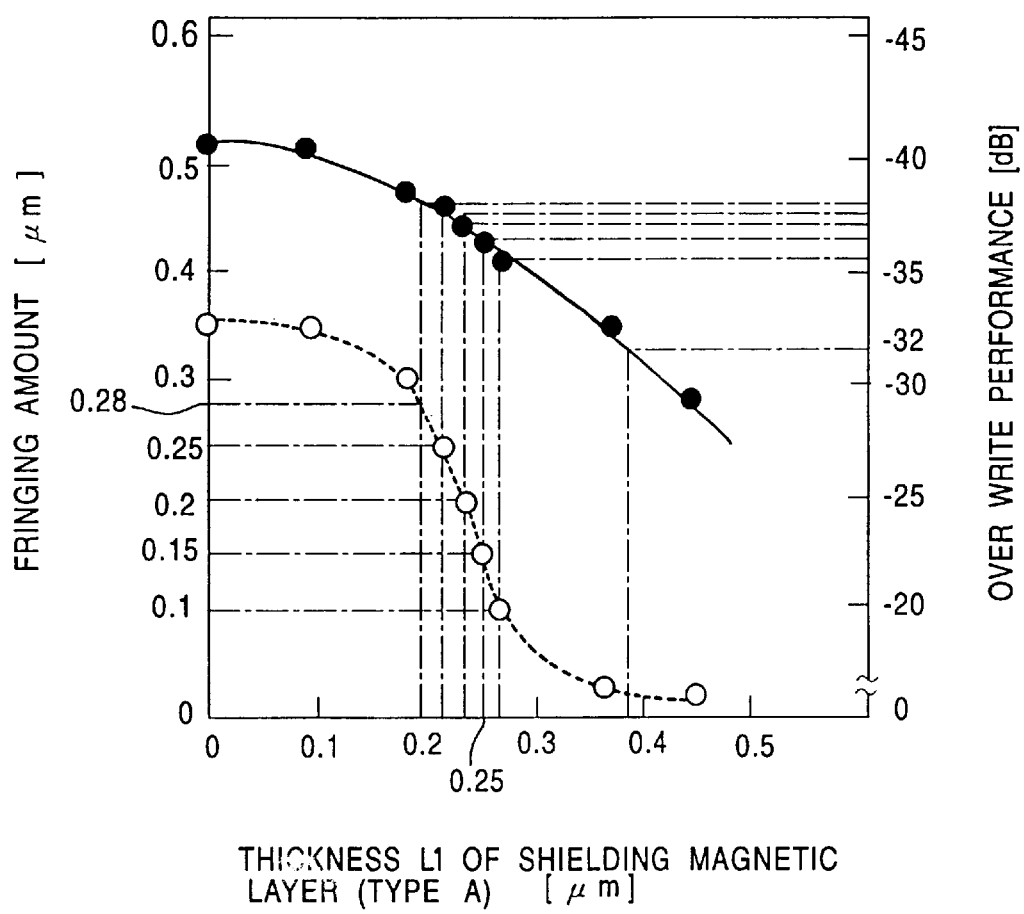
FIG. 12 is a graph showing the relations between the saturation magnetic flux density Bs·the thickness L1 and the write fringing amount and between Bs·L1 and over write performance when the shielding magnetic layer 4 of the combination read/write thin film magnetic head shown in FIG. 3 is formed by using a Ni—Fe alloy.
Figure 13:
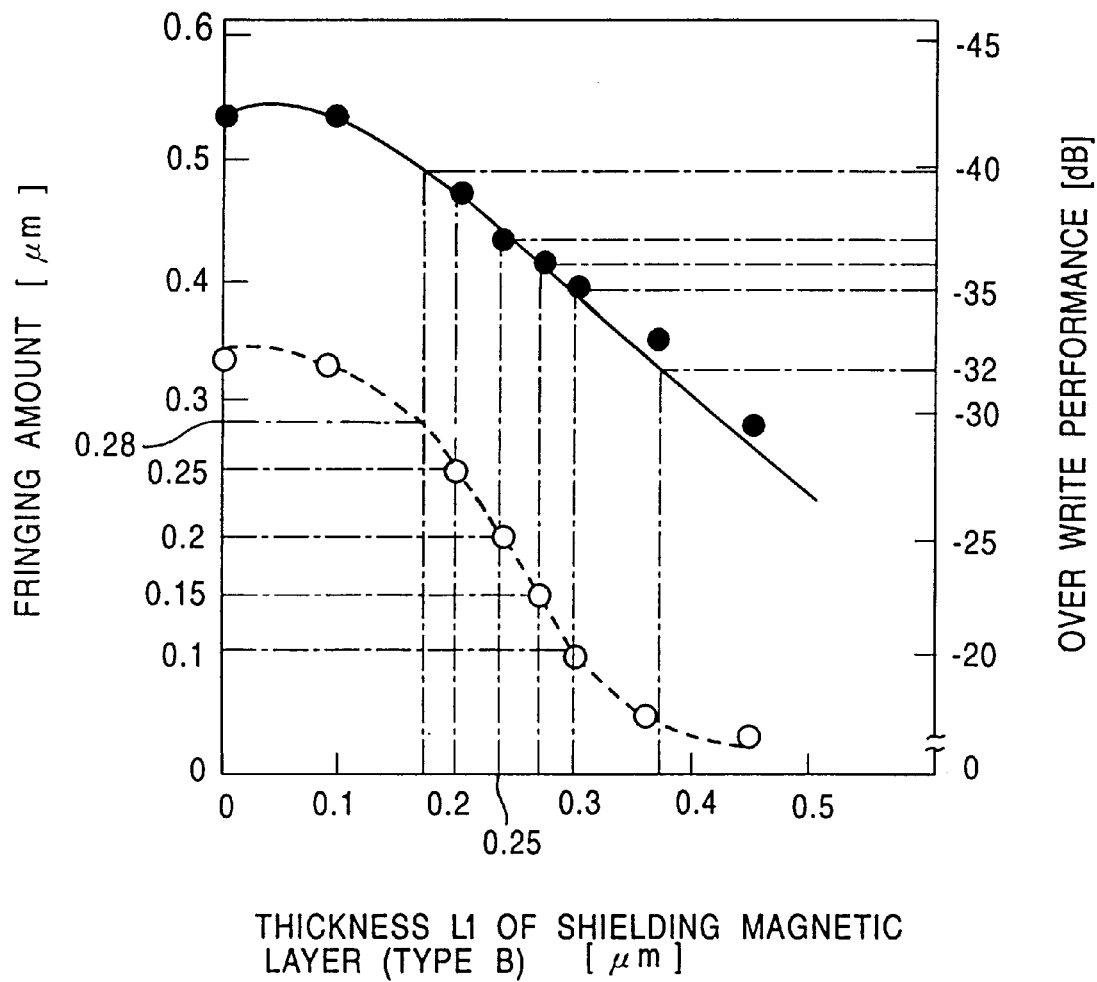
FIG. 13 is a graph showing the relations between the saturation magnetic flux density Bs·the thickness L1 and the write fringing amount and between Bs·L1 and over write performance when the shielding magnetic layer 4 of the combination read/write thin film magnetic head shown in FIG. 4 is formed by using a Ni—Fe alloy.
Figure 14:
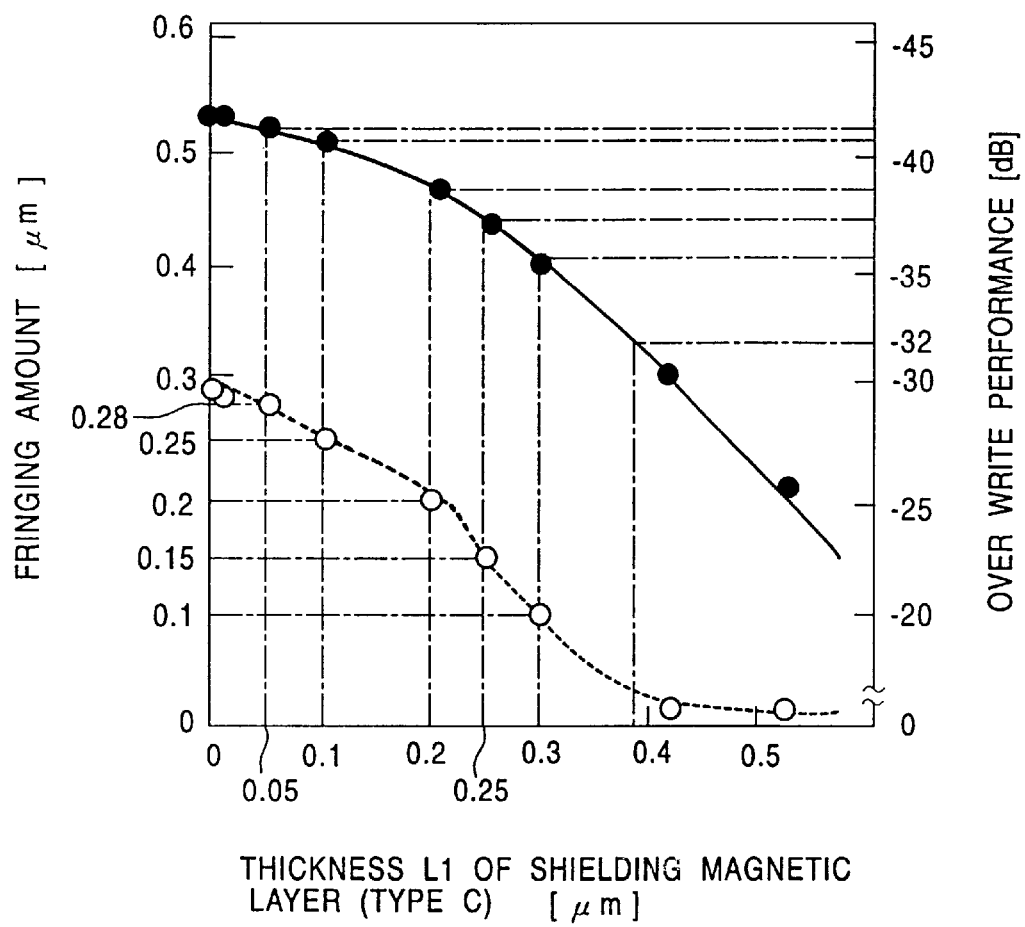
FIG. 14 is a graph showing the relations between the saturation magnetic flux density Bs·the thickness L1 and the write fringing amount and between Bs·L1 and over write performance when the shielding magnetic layer 4 of the combination read/write thin film magnetic head shown in FIG. 5 is formed by using a Ni—Fe alloy.
Figure 15:
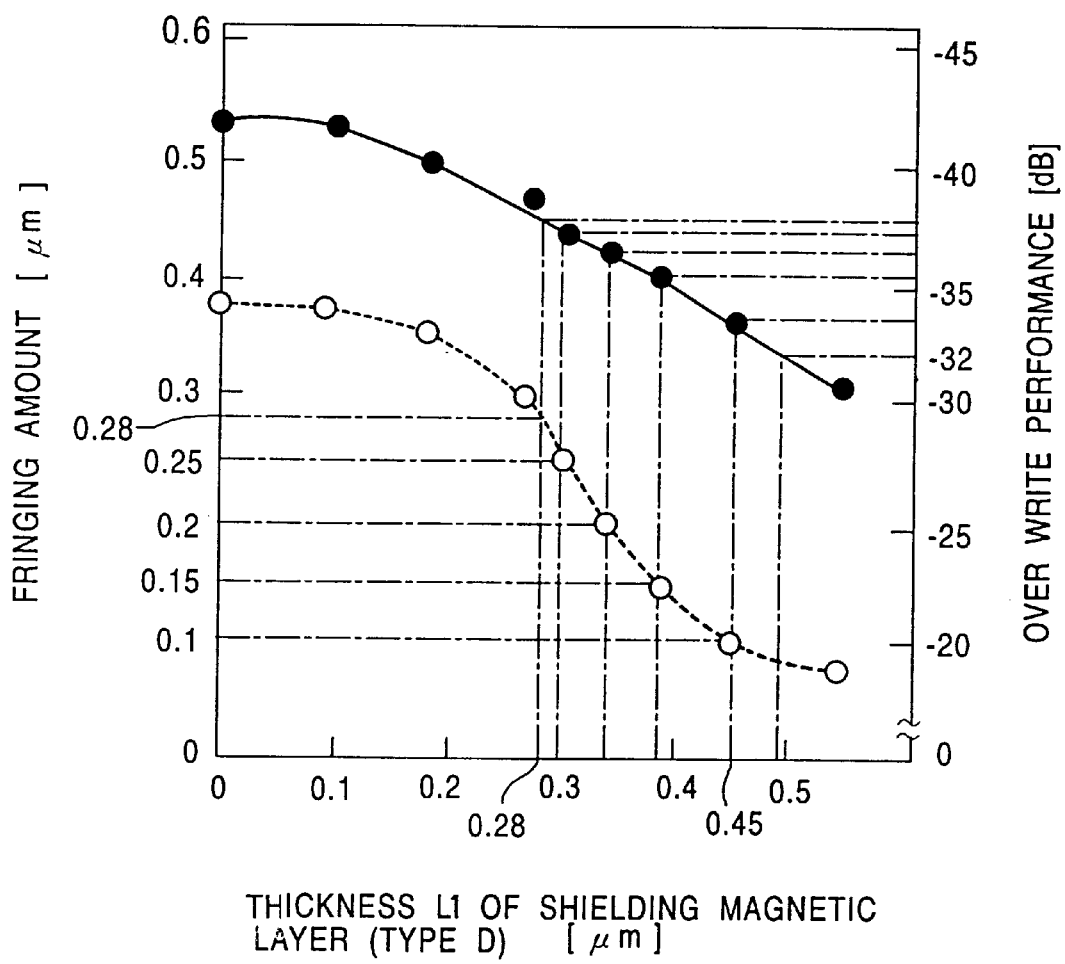
FIG. 15 is a graph showing the relations between the saturation magnetic flux density Bs·the thickness L1 and the write fringing amount and between Bs·L1 and over write performance when the shielding magnetic layer 4 of the combination read/write thin film magnetic head shown in FIG. 7 is formed by using a Ni—Fe alloy.
Figure 16:
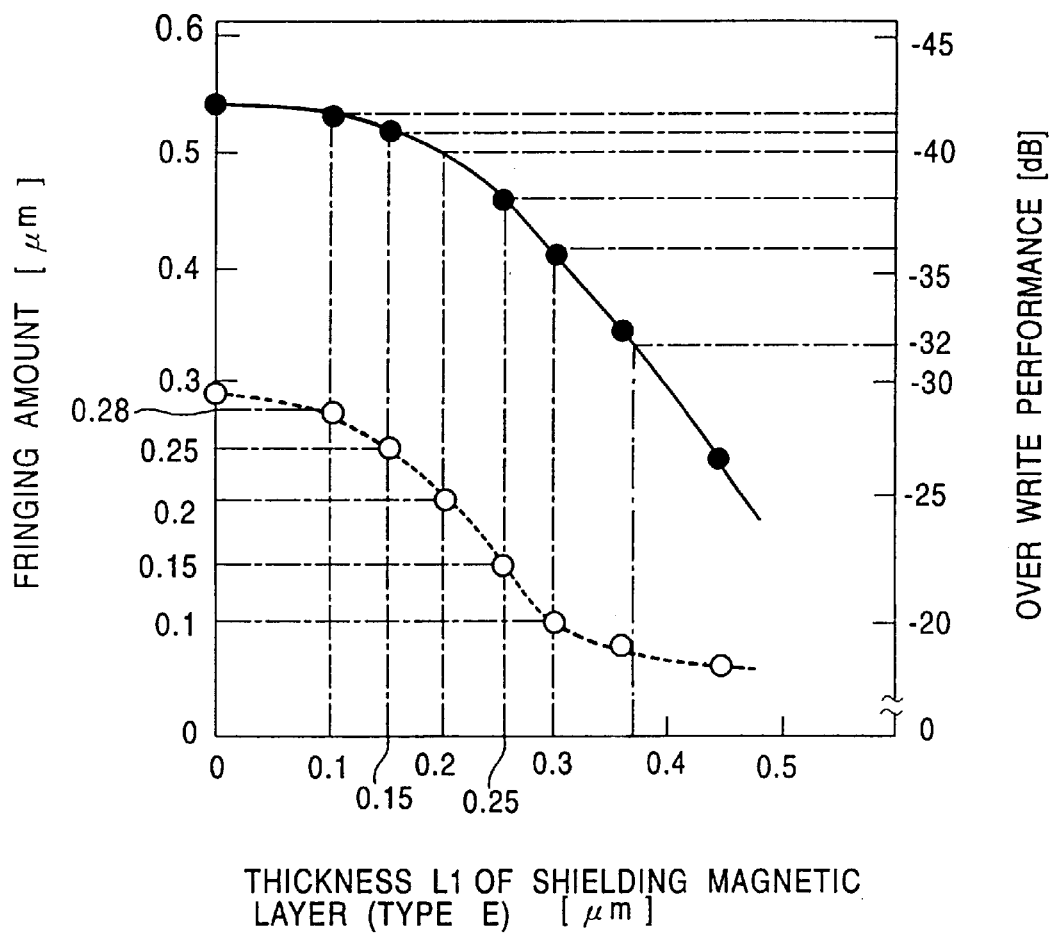
FIG. 16 is a graph showing the relations between the saturation magnetic flux density Bs·the thickness L1 and the write fringing amount and between Bs·L1 and over write performance when the shielding magnetic layer 4 of the combination read/write thin film magnetic head shown in FIG. 8 is formed by using a Ni—Fe alloy.
Figure 17:
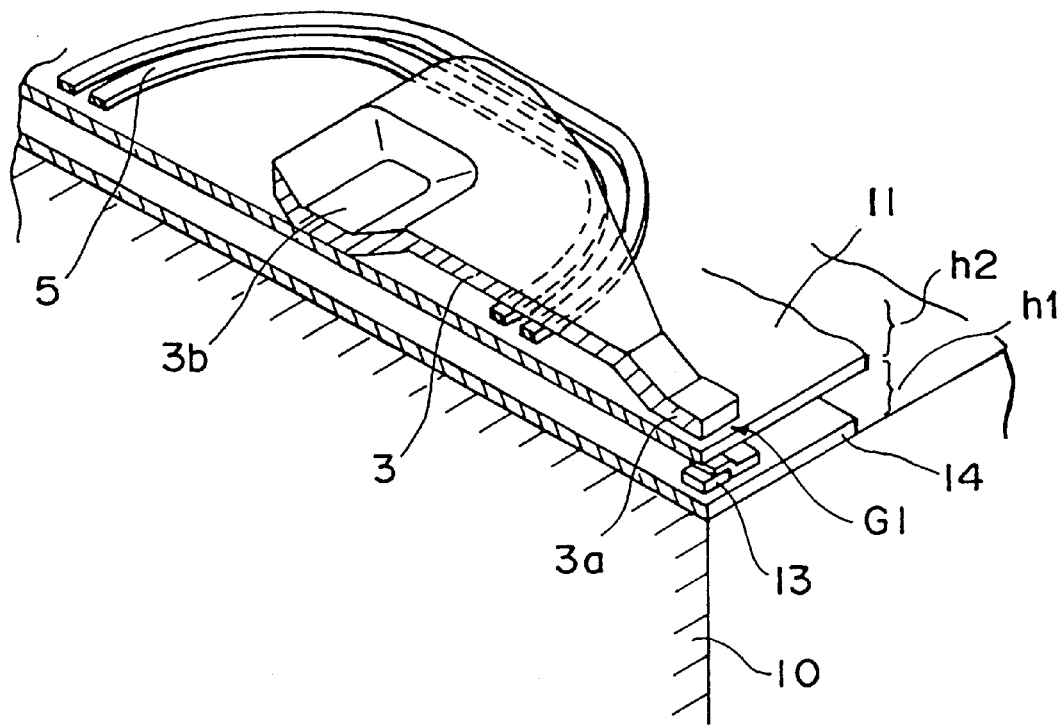
FIG. 17 is a half sectional perspective view showing the shapes of a lower core layer and an upper core layer of a conventional combination read/write thin film magnetic head.
Figure 18A:
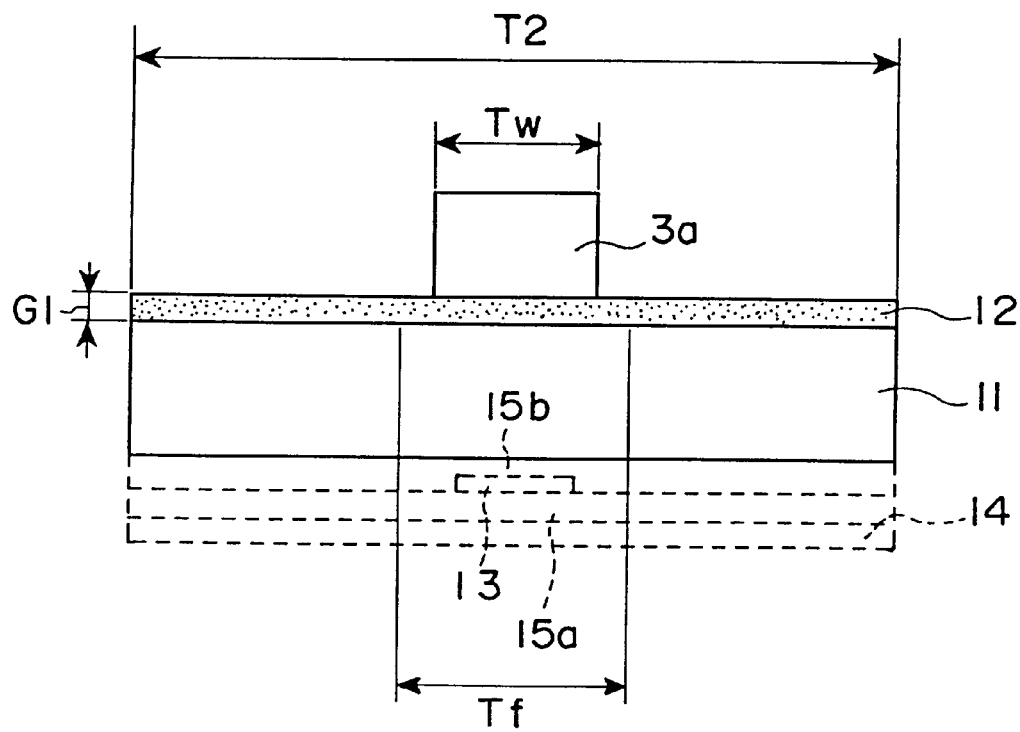
FIG. 18(A) is a partially enlarged front view as viewed from the front side of a conventional combination read/write thin film magnetic head.
Figure 18B:
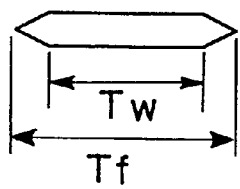
FIG. 18(B) is a drawing showing the image of a record pattern recorded on a recording medium by using the magnetic head shown in FIG. 18(A).

Preferably, the absolute value of over write performance (dB) is 32 dB or more, and the fringing amount is 0.28 μm or less. When L1 corresponding to these ranges is determined from each of the figures, L1 of Type A shown in FIG. 12 is 0.2 to 0.38 μm, L1 of Type B shown in FIG. 13 is 0.17 to 0.37 μm, L1 of Type C shown in FIG. 14 is 0.05 to 0.38 μm, L1 of Type D shown in FIG. 15 is 0.28 to 0.48 μm, and L1 of Type E shown in FIG. 16 is 0.1 to 0.37 μm.

More preferably, the absolute value of over write performance (dB) is 32 dB or more, and the fringing amount is 0.25 μm or less. When L1 corresponding to these ranges is determined from each of the figures, L1 of Type A shown in FIG. 12 is 0.21 to 0.38 μm, L1 of Type B shown in FIG. 13 is 0.2 to 0.37 μm, L1 of Type C shown in FIG. 14 is 0.1 to 0.38 μm, L1 of Type D shown in FIG. 15 is 0.3 to 0.48 μm, and L1 of Type E shown in FIG. 16 is 0.15 to 0.37 μm.

More preferably, the absolute value of over write performance (dB) is 32 dB or more, and the fringing amount is 0.2 μm or less. When L1 corresponding to these ranges is determined from each of the figures, L1 of Type A shown in FIG. 12 is 0.24 to 0.38 μm, L1 of Type B shown in FIG. 13 is 0.24 to 0.37 μm, L1 of Type C shown in FIG. 14 is 0.2 to 0.38 μm, L1 of Type D shown in FIG. 15 is 0.34 to 0.48 μm, and L1 of Type E shown in FIG. 16 is 0.21 to 0.37 μm.

More preferably, the absolute value of over write performance (dB) is 32 dB or more, and the fringing amount is 0.15 μm or less. When L1 corresponding to these ranges is determined from each of the figures, L1 of Type A shown in FIG. 12 is 0.25 to 0.38 μm, L1 of Type B shown in FIG. 13 is 0.27 to 0.37 μm, L1 of Type C shown in FIG. 14 is 0.25 to 0.38 μm, L1 of Type D shown in FIG. 15 is 0.39 to 0.48 μm, and L1 of Type E shown in FIG. 16 is 0.25 to 0.37 μm.

Most preferably, the absolute value of over write performance (dB) is 32 dB or more, and the fringing amount is 0.1 μm or less. When L1 corresponding to these ranges is determined from each of the figures, L1 of Type A shown in FIG. 12 is 0.26 to 0.38 μm, L1 of Type B shown in FIG. 13 is 0.3 to 0.37 μm, L1 of Type C shown in FIG. 14 is 0.3 to 0.38 μm, L1 of Type D shown in FIG. 15 is 0.45 to 0.48 μm, and L1 of Type E shown in FIG. 16 is 0.3 to 0.37 μm.

Therefore, it is thought that when a Ni—Fe alloy is used for the shielding magnetic layer, the thickness L1 of the shielding magnetic layer is preferably appropriately selected within the range of 0.05 to 0.48 μm in order to achieve an absolute value of over write performance (dB) of 32 dB or more, and a fringing amount of 0.28 μm or less.

It is also thought that the thickness L1 of the shielding magnetic layer is preferably appropriately selected within the range of 0.1 to 0.48 μm in order to achieve an absolute value of over write performance (dB) of 32 dB or more, and a fringing amount of 0.25 μm or less.

It is further thought that the thickness L1 of the shielding magnetic layer is preferably appropriately selected within the range of 0.2 to 0.48 μm in order to achieve an absolute value of over write performance (dB) of 32 dB or more, and a fringing amount of 0.2 μm or less.

It is further thought that the thickness L1 of the shielding magnetic layer is preferably appropriately selected within the range of 0.25 to 0.48 μm in order to achieve an absolute value of over write performance (dB) of 32 dB or more, and a fringing amount of 0.15 μm or less.

It is further thought that the thickness L1 of the shielding magnetic layer is preferably appropriately selected within the range of 0.26 to 0.48 μm in order to achieve an absolute value of over write performance (dB) of 32 dB or more, and a fringing amount of 0.1 μm or less.

As described above, in the present invention, the shielding magnetic layer made of a soft magnetic material is provided on both sides of the gap layer so that blots of the record magnetic field out of the track width can be absorbed by the shielding magnetic layer, and write fringing can be prevented. Particularly, when the shielding magnetic layer is formed with the saturation magnetic flux density and the thickness appropriately adjusted, it is possible to suppress write fringing and at the same time, maintain reproduced output at a high level.

Also the manufacturing method of the present invention is capable of forming the shielding magnetic layer by removing the lower core layer and readhering the removed soft magnetic material to both sides of the gap layer, thereby facilitating manufacture.

What is claimed is:

1. A method of manufacturing a combination read/write thin film magnetic head comprising a lower core layer of a magnetic material, an upper core layer of a magnetic material provided opposite to the lower core layer and having a width smaller than the width of the lower core layer, a gap layer interposed between the lower core layer and the upper core layer, wherein the lower core layer has a portion where the upper core layer and the lower core layer are not opposite to each other; the method comprising the steps of:

forming a non-magnetic material layer on the lower core layer;

forming the upper core layer on the non-magnetic material layer, where the upper core layer has a width smaller than the width of the non-magnetic material layer, wherein the non-magnetic material layer has a portion where the upper core layer and the non-magnetic material layer are not opposite to each other;

removing the portion of the non-magnetic material layer where the upper core layer and the lower core layer are not opposite to each other, leaving the non-magnetic material layer between the upper core layer and the lower core layer to form the gap layer; and forming a shielding magnetic layer of a soft magnetic material on both sides of the gap layer in the direction of the track width.

2. A method of manufacturing a combination read/write thin film magnetic head according to claim 1, wherein the non-magnetic material layer serving as the gap layer is formed of a material which can be removed by plasma etching, and a portion of the non-magnetic material layer where the lower core layer and the upper core layer are not opposite to each other is removed by plasma etching.

3. A method of manufacturing a combination read/write thin film magnetic head according to claim 2, wherein the shielding magnetic layer is formed by deposition.

4. A method of manufacturing a combination read/write thin film magnetic head according to claim 2, wherein the shielding magnetic layer is formed by ion-milling the lower core layer, and readhering the magnetic material removed from the lower core layer by ion-milling to both sides of the gap layer in the direction of the track width.

5. A method of manufacturing a combination read/write thin film magnetic head according to claim 1, wherein a portion of the non-magnetic material layer where the lower core layer and the upper core layer are not opposite to each other is removed by ion-milling.

6. A method of manufacturing a combination read/write thin film magnetic head according to claim 5, wherein the shielding magnetic layer is formed by deposition.

7. A method of manufacturing a combination read/write thin film magnetic head according to claim 5, wherein the shielding magnetic layer is formed by ion-milling the lower core layer, and readhering the magnetic material removed from the lower core layer by ion-milling to both sides of the gap layer in the direction of the track width.

8. A method of manufacturing a combination read/write thin film magnetic head according to claim 1, wherein the shielding magnetic layer is formed by deposition.

9. A method of manufacturing a combination read/write thin film magnetic head according to claim 1, wherein the shielding magnetic layer is formed by ion-milling the lower core layer, and readhering the magnetic material removed from the lower core layer by ion-milling to both sides of the gap layer in the direction of the track width.

\* \* \* \* \*